United States Patent [19]
Means et al.

[11] Patent Number: 6,159,379
[45] Date of Patent: Dec. 12, 2000

[54] ORGANIC AMMONIUM SALTS FOR THE REMOVAL OF WATER SOLUBLE ORGANICS IN PRODUCED WATER

[75] Inventors: Charles Mitchell Means, Richmond; Michael Paul Squicciarini, Stafford, both of Tex.

[73] Assignee: Baker Hughes Incorporated, Houston, Tex.

[21] Appl. No.: 09/305,235

[22] Filed: May 4, 1999

[51] Int. Cl.$^7$ ..................................................... C02F 1/58
[52] U.S. Cl. .................. 210/708; 210/725; 210/728; 210/729; 210/908; 210/909
[58] Field of Search .................. 210/634, 638, 210/639, 708, 725, 727, 728, 729, 908, 909

[56] References Cited

U.S. PATENT DOCUMENTS

| | | | |
|---|---|---|---|
| 3,239,461 | 3/1966 | Sebba | 210/704 |
| 3,687,845 | 8/1972 | Treat et al. | 210/54 |
| 4,035,289 | 7/1977 | Guillerme et al. | 210/11 |
| 4,401,570 | 8/1983 | Blytas | 210/639 |
| 4,600,518 | 7/1986 | Ries et al. | 252/34 |
| 4,729,832 | 3/1988 | Leonard et al. | 210/639 |
| 4,818,410 | 4/1989 | Bellos et al. | 210/639 |
| 4,839,054 | 6/1989 | Ruebush et al. | 210/639 |
| 5,013,451 | 5/1991 | Thompson et al. | 210/708 |
| 5,354,477 | 10/1994 | Rush | 210/708 |
| 5,364,532 | 11/1994 | Bellos et al. | 210/639 |
| 5,439,592 | 8/1995 | Bellos et al. | 210/908 |
| 5,587,084 | 12/1996 | Boyd et al. | 210/908 |
| 5,637,223 | 6/1997 | Bellos et al. | 210/639 |
| 5,804,078 | 8/1998 | Morrow et al. | 210/708 |

OTHER PUBLICATIONS

M. Means, et al., "New, Non–Acid Water Soluble Organic (WSO) Removal Techniques," *1998 Produced Water Management Forum, API*, Lafayette, LA, 1998.

*Primary Examiner*—Peter A. Hruskoci
*Attorney, Agent, or Firm*—Madan, Mossman & Sriram, P.C.

[57] ABSTRACT

A method has been discovered for removing organics, such as water soluble organics (WSO), from fluids containing water, such as oil process water, by contacting the fluid with an effective amount of an organic ammonium salt. No added acid is necessary, although in some embodiments, weak acids such as glycolic acid, can be used to give synergistic improvement in organic removal. Suitable organic ammonium salts have the formula:

$$R^1R^2R^3N^+H\ X^-$$

where $R^1$ is a saturated or unsaturated alkyl group or an aryl group, or saturated or unsaturated alkyl group or an aryl group substituted with a heteroatom selected from the group consisting of N, O, S, P and halogen; $R^2$, and $R^3$ are independently H or a saturated or unsaturated alkyl group or an aryl group, or saturated or unsaturated alkyl group or an aryl group substituted with a heteroatom selected from the group consisting of N, O, S, P and halogen; and X is a halogen atom or an anion of a protic acid.

4 Claims, 9 Drawing Sheets

ORGANIC AMMONIUM SALTS FOR THE REMOVAL OF WATER SOLUBLE ORGANICS IN PRODUCED WATER

FIELD OF THE INVENTION

The present invention relates to methods and compositions for removing water soluble organics (WSO) from oil process water, and more particularly relates, in one embodiment, to methods and compositions for removing WSO from crude oil production water and from aqueous streams used in removing water and/or inorganic salts, such as sodium chloride, from crude oil, residual oil, waste oils and the like, which do not require acids.

BACKGROUND OF THE INVENTION

The production of petroleum hydrocarbons from underground formations usually produces varying amounts of formation or connate water. The production ratio of "produced water" as it is often called, to petroleum hydrocarbons usually increases over the lifetime of a well. It is not uncommon that oil well production fluids are composed of 90% or more of water and only 10% or less of crude oil. Produced oilfield water contains a diverse mixture of compounds that varies from formation to formation. The term "water soluble organics" (WSO) has been used to describe a group of these components that are slightly water soluble depending on system conditions. These WSO compounds naturally occur in crude oil. WSO usually consist of naphthenates, carboxylic acids, lower fatty acids, and phenols. Water soluble inorganic salts present may include sodium chloride, sodium sulfate, calcium chloride, barium chloride, etc. While the amount of water soluble organics may be relatively small, up to 1,000 ppm, they nevertheless give rise to environmental problems when the aqueous phase is discharged into the environment without their removal. These compounds are included in the EPA recognized gravimetric analysis method used to monitor produced water discharges and sometimes make it difficult for producers to meet discharge requirements. In order to meet present day strict environmental standards, a process to reduce the level of the water soluble organics in the discharged streams to 50 ppm or less is needed. Furthermore, the water soluble organics may be valuable substances.

One of the first steps after removal of the oil well production fluid is to separate the oil from the water by phase separation techniques. Separation is conventionally accomplished using a bulk separator or a free water knock out system. Virtually all of the hydrocarbon is conveniently recovered in this manner. However, such traditional oil-water separation methods do not remove these WSO compounds from produced water.

Over the past several years, many methods have been utilized to remove WSO from produced water. Filtration with various types of media, membranes, ion exchange, bacterial degradation, oxidation, and acidification have all been tried with various degrees of success. For example, one could separate the water and water soluble organics by distillation or the use of biological treating ponds. Other methods include reverse osmosis, activated charcoal, and ceramic filters.

One common cost-effective method of treatment utilizes acids to lower the pH of the produced water and force the WSO components into the crude oil. Acidification and extraction of the WSO into the crude is simple, cost-effective, and requires very little additional equipment. The mechanism is simple: 1) the water soluble organic acid salts are converted to the oil soluble organic acids by lowering the pH, and 2) these oil soluble organics are extracted into the crude. However, there are significant disadvantages to this method, including, but not limited to, the hazards of handling acid, corrosion problems in storage and processing equipment, and reduced effectiveness of conventional water clarifiers.

For example, U.S. Pat. No. 5,364,532 involves oil well production fluids composed of oil and water and containing in excess of 100 ppm water soluble petroleum carboxylates in anionic form dissolved in the water which are treated by acidifying the fluid to a pH of 6.0 or lower with a combination of a strong organic acid and a strong mineral acid, which are then intimately mixed. The oil and water are separated one from the other. The content of the water soluble organics in the water is thereby substantially transferred to the oil phase.

U.S. Pat. No. 5,637,223 concerns treatment of oil well production fluids composed of oil and water and containing in excess of 100 ppm water soluble petroleum carboxylate in anionic form dissolved in the water by acidifying the fluid to a pH of 6.0 or lower with a combination of a strong organic acid and a strong mineral acid, and then intimately mixing them. The oil and water are separated from each other. The content of the water soluble organics in the water is thereby substantially transferred to the oil phase.

It would be desirable if a simple, economical procedure for accomplishing this end could be provided. While known non-acidic methods can reduce the content of water soluble organics to the desired low level, they are relatively complex and/or expensive.

Conventional water clarifiers predominantly remove insoluble oil and generally remove only small or very little amounts of WSO. Cationic products remove 10–20% of the WSO in produced water where cationic products are the product of choice.

It would thus be desirable to develop a composition and method employing it which did not require acid pH.

SUMMARY OF THE INVENTION

Accordingly, it is an object of the present invention to provide a method and composition for removing organics such as WSO from fluids containing them and water, such as oil process water, without the use of a strong acid.

It is another object of the present invention to provide a method and composition for removing organics from liquids containing water where the oil phase can be easily separated from the water phase.

In carrying out these and other objects of the invention, there is provided, in one form, a method of removing organics from fluids containing water involving contacting the fluid with an effective amount of an organic ammonium salt, and then separating at least one organic from the water.

DETAILED DESCRIPTION OF THE INVENTION

It has been discovered that a new line of organic removal compositions, particularly WSO removal compositions, provide an alternative to conventional forms of WSO treatment. It has been discovered that organic ammonium salts can be added to liquids containing water as well as water soluble or dispersed organic compounds. The organic ammonium salts, with mixing, can interact with the organic compounds to bring them into the oil phase. The oil phase can then be easily separated from the water.

In one embodiment, this invention does not involve the use of strong acids unlike compositions previously used. Strong acids are defined herein as acids having a pKa of less than or equal to 3.2. Strong acids thus include hydrochloric acid, sulfuric acid, phosphoric acid, phosphorous acid, citric acid, and the like, and mixtures thereof. Such acids have been used in the past to adjust the pH of the liquid treated to be about 6.0 or less.

Further, amines, particularly quaternary amines, have been used to remove organics from oil and water mixtures in the past. Such quaternary amines include materials such as 2-hydroxy-N,N,N-trimethyl-ethanaminium chloride; 2-hydroxy-N,N,N-trimethyl-ethanaminium acetate; 2-hydroxy-N,N,N-trimethyl-ethanaminium salt with 2-hydroxy-1,2,3-propane tricarboxylic acid; and the like. These materials and others like them are more polar in nature, i.e. containing more charge density and/or containing more heteroatoms as compared with the inventive longer hydrocarbon chain organic ammonium salts (ammonium salts of fatty acids).

In another embodiment of the invention, the organic ammonium salts are used in conjunction with weak acids to give synergistic results, i.e. more than what would be expected from a mere addition of the two types of components. Weak acids are defined herein as acids having a pKa of greater than 3.2. Suitable specific examples of weak acids for use with the invention herein include, but are not necessarily limited to, glycolic acid, acetic acid, carbonic acid, propionic acid, benzoic acid, formic acid and the like, and mixtures thereof. In one embodiment of the invention, the pH of the liquid treated with this blend of material is greater than about 6.0.

While the compositions and methods of this invention may be used primarily on off-shore platforms, it is anticipated that they could be used in many other contexts. For instance, organic materials could be removed from liquids containing water in industrial applications including, but not necessarily limited to:

1. Refinery units, such as for desalter water, overhead accumulator/knockout pot water or other process waters.

2. Waste treatment units such as API separators and gas flotation cells or other units which process industrial waste waters.

3. Waste oil recovery systems such as refinery slop oil treatment facilities and oil recycling facilities.

4. Ship ballast water and oil storage terminal tank water bottoms.

5. Steel mills and metal finishing plants using fatty acid-based synthetic rolling oils which produce fluids high in soluble organics.

6. Dairy processing plants.

7. Food processing plants, including slaughterhouses, e.g. for chickens, cows and pigs, and the like.

Suitable organic ammonium salts include, but are not limited to organic ammonium salt having the formula:

where

R$^1$ is a saturated or unsaturated alkyl group, aryl group, or saturated or unsaturated alkyl group, aryl group substituted with a heteroatom selected from the group consisting of N, O, S, P, and the halogen atoms, where R$^1$ averages from about 4 to about 20 carbon atoms, preferably from about 7 to about 12 carbon atoms;

R$^2$, and R$^3$ are independently H or a saturated or unsaturated alkyl group, aryl group, or saturated or unsaturated alkyl group, aryl group substituted with a heteroatom selected from the group consisting of N, O, S, P, and the halogen atoms, where R$^2$, and R$^3$ independently are H or average from about 1 to about 8 carbon atoms, preferably from about 1 to about 3 carbon atoms; and X is a halogen atom, where preferred halogen atoms include chlorine an bromine, or X is an anion of a protic acid, which may include, but is not necessarily limited to, carboxylic acids, perchloric acid and carbonic acid. Specific organic ammonium salts that have shown promise include, but are not necessarily limited to, N,N-dimethyloctylammonium chloride and N,N-dimethyldecylammonium chloride. These materials are clear liquids, with a specific gravity around 0.94–0.98, a pH range of 6.9–7.4, and an activity range of 40–60%. The balance of the material employed as the WSO removing composition is an aqueous solvent, preferably water.

These materials are typically made by adding one part amine (e.g. N,N-dimethyldecylamine, N,N-dimethyloctylamine, and the like) to one part HCl or other protic acids. As noted, other examples of protic acids may include, but are not necessarily limited to, carboxylic acids, perchloric acid and carbonic acid.

In one non-limiting embodiment of the invention, the organic ammonium salt is added in a proportion ranging from about 50 to about 2,000 ppm, based on the total amount of oil process water. This proportion is calculated on a 40–60% active basis. Preferably, the proportion ranges from about 100 to about 1000 ppm, based on the total amount of oil process water or fluid being treated. Stated another way, and considering the entire treated fluid, the amount of organic ammonium salt may be present in a proportion ranging from about 50 to about 3,000 ppm.

As mentioned, in one non-limiting embodiment of the invention, the oil process water may be that removed from an oil well along with crude oil, or may be water used to extract corrosive inorganic compounds from fuel oil to render the fuel oil suitable for fueling gas turbine power plants. The WSO being removed may include petroleum carboxylate anions, but may also include other organic materials.

More specifically, it is conventional to denote the water soluble organics found in and recovered from petroleum generally as "petroleum acids" and more specifically as "naphthenic acids". Chemically, the petroleum acids are, in the main, monocarboxylic acids related to the naphthalene (alicyclic) series of hydrocarbons. However, other petroleum acidic substances are included. For example, substituted phenols, mercaptans, long chain ketones, etc. may act as petroleum acids in the sense of this process. Petroleum acids are natural components of crude oil and are not formed by refining. A typical formula of these acids may be written as $R(CH_2)_nCOOH$, where R may be a cyclic moiety composed of 1, 2, 3 or more rings including such acids as cyclopentaneacetic acid and trans-2,2,6-trimethylcyclohexylacetic acid and n is usually 1 or higher. Aromatic rings, saturated rings and fused rings are normally present. It has been found that as many as 120 or more different petroleum acids may be present in a given crude oil. Most are soluble in all proportions in hydrocarbons, but most of the acids of the series have only slight solubility in water. However, as their sodium salts or other alkali metal salts these naphthenates are preferentially water soluble. It is to be understood that, at the pH of the naturally occurring aqueous compositions, the acids may exist as anions in association with counterions of sodium, calcium, etc. For example, naphthenic acids can be regarded as being present as naphthenate salts. Often, therefore, petroleum acids in the aqueous phase of oil production fluids are in anionic form and may be more properly termed as petroleum carboxylate salts, phenates and other salts. It is with removal of these WSO that the present invention is concerned.

The invention will be further described with respect to specific examples which are meant to illuminate the invention and not limit it to any particular embodiment.

Two inventive products, Component (A), (N,N-dimethyloctylammonium chloride) and Component (B), (N,N-dimethyldecylammonium chloride) have been evaluated on field water samples. Component (A) has been plant tested at two platforms in the Gulf of Mexico. In all tests, the experimental products were tested against Baker Petrolite's commercially available water clarifier product, RBW3900. RBW3900 is a proprietary inhibited acid blend of low pKa.

The lab and field bottle tests utilized a mixed fluid extraction method. In general terms, 100 ml of non-treated produced water was mixed with 10 ml (10%) crude in a bottle. The WSO removal chemical was injected and the bottles shaken 200 times for 2 minutes. A sample of the treated water was taken via a syringe and analyzed for total oil/grease and WSO content using the IR-silica gel method.

Figure 1:
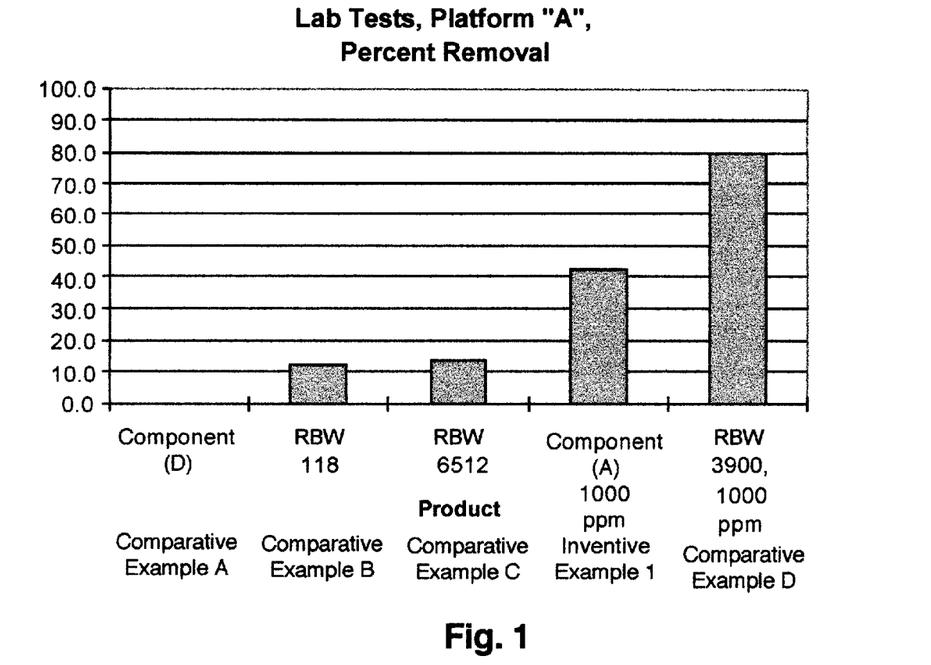
FIG. 1 is a chart of the percent removal of WSO at various concentrations of inventive and comparative products in lab tests.

The first evaluations were completed on field samples of produced water from platform "A". This facility is located in the Gulf of Mexico and has a history of WSO problems. WSO levels at this facility typically range from around 50 to 60 ppm as measured by the IR-silica gel method; total oil and grease is about 63 ppm by IR. Results from the initial lab tests are shown in Table I and FIG. 1.

TABLE I

Lab Tests, Platform "A" - Percent WSO Removal

| Ex. | Name | Chemical identity | Dosage | % WSO Removal |
|---|---|---|---|---|
| Comparative A | Component (D) | Experimental polyamine. | 1000 ppm | 0 |
| Comparative B | RBW 118 | Commercial water clarifier available from Baker Petrolite. | 1000 ppm | 12 |
| Comparative C | RBW 6512 | Commercial water clarifier available from Baker Petrolite. | 1000 ppm | 13 |
| Inv. 1 | Component (A) | N,N-dimethyloctylammonium chloride | 1000 ppm | 42 |
| Comparative D | RBW3900 | Commercial water clarifier available from Baker Petrolite. | 1000 ppm | 80 |

Figure 2:
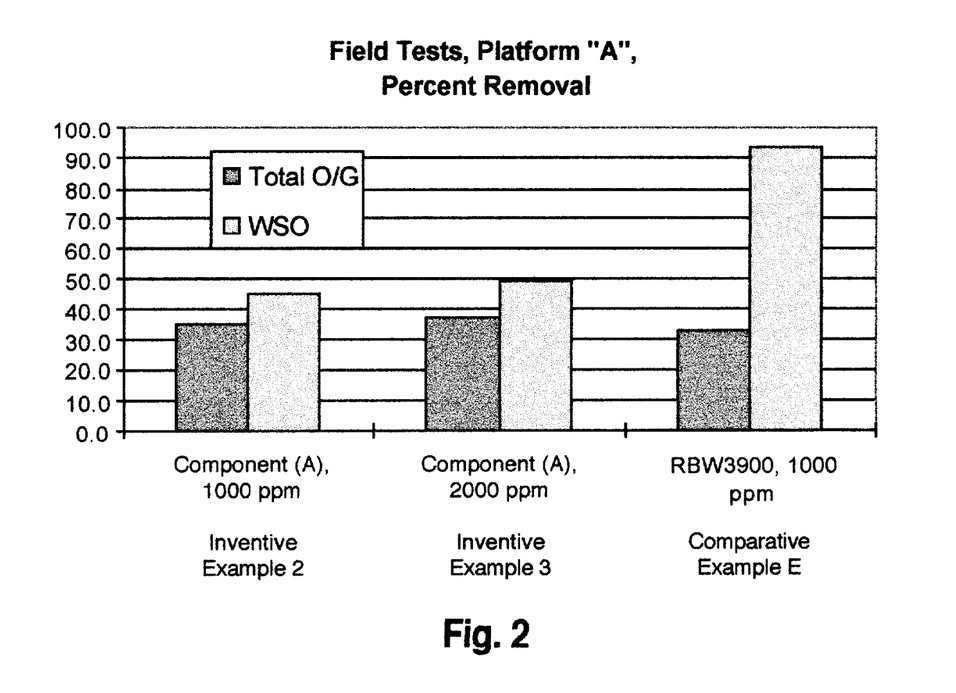
FIG. 2 is a chart of the percent removal of total O/G and WSO at various concentrations of an inventive and a comparative product in field tests.

These results looked favorable, so bottle testing in the field was carried out. Field bottle test results from platform "A" are shown in FIG. 2, where "Total O/G" refers to percent removal of total oil and grease.

Figure 8:
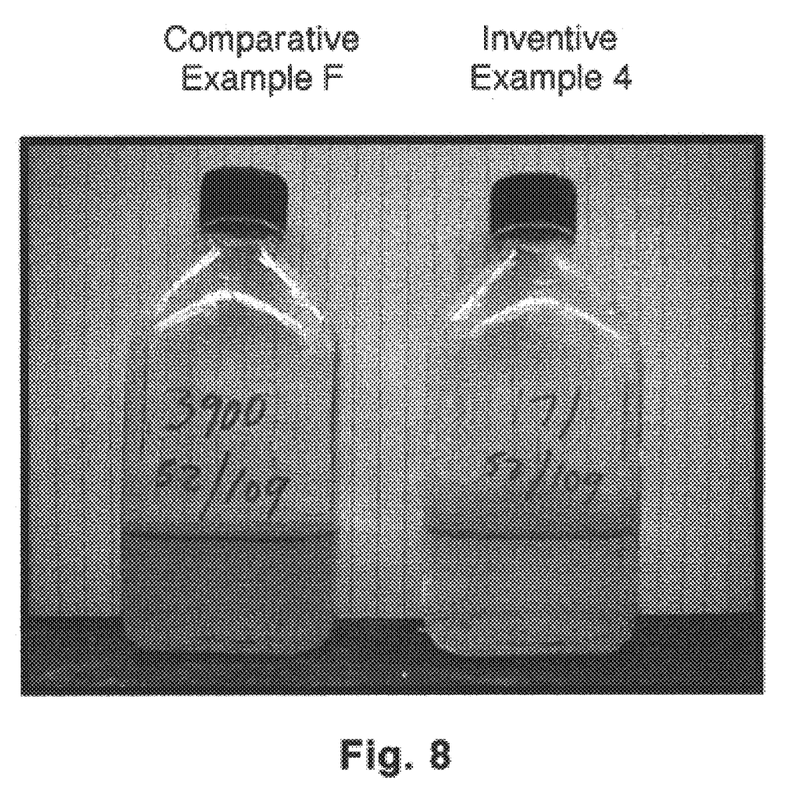
FIG. 8 is a photograph of a comparison of the bottle test results showing how conventional water clarification chemicals gives a clearer effluent with the inventive composition (right) as contrasted with a combination with the conventional WSO removal composition (left)

Additionally, since these new products are non-acid, in some embodiments, traditional water clarification chemicals tend to work better and at lower concentrations than when used in conjunction with strong acid-based products. FIG. 8 shows a comparison of bottle test results from platform "A". In this test, RBW3900 and Component (A) were used to treat the water in conjunction with the other two conventional water clarifiers used at the facility. The combination of Component (A) and the conventional water clarifiers (Example 4, bottle on the right) produces more transparent water at the same treatment rates than the conventional WSO removal composition (Example E on the left).

Figure 3:
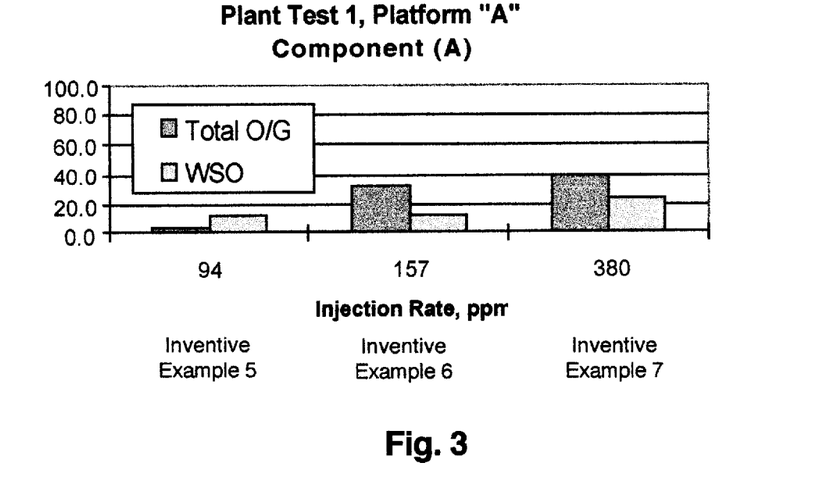
FIG. 3 is a chart of the percent removal of total O/G and WSO at various concentrations of an inventive product in a plant test.

Next, a plant test was completed at platform "A". Component (A) was injected into mixed production at the header at 94, 157, and 380 ppm, respectively (Examples 5, 6 and 7, respectively). Injection was performed upstream of a secondary separator, into the water phase and where free oil is present. The chemical pumps available on the platform were only capable of a maximum of 380 ppm injection rate. Even so, Component (A) showed better than 20% removal of WSO and 40% removal of total oil and grease at this rate. These results are shown in FIG. 3.

Figure 4:
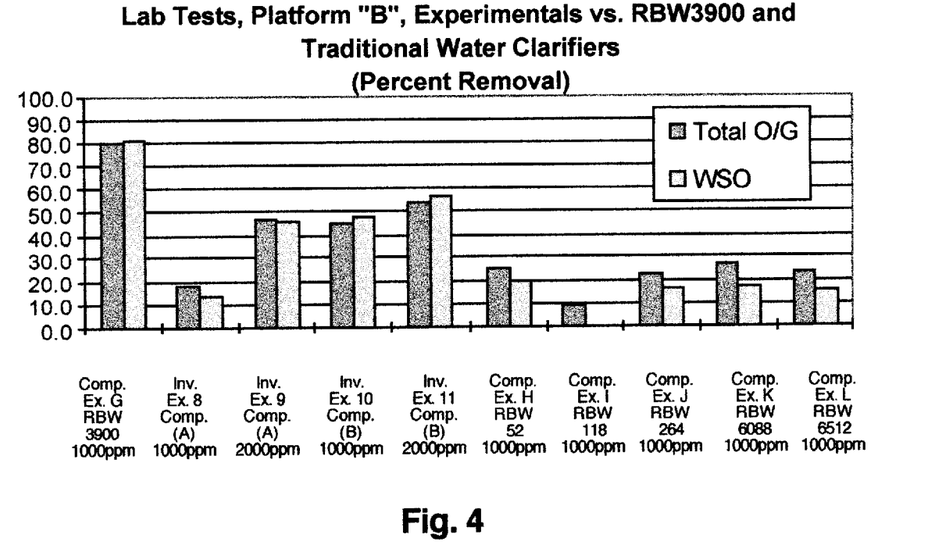
FIG. 4 is a chart of the percent removal of total O/G and WSO at various concentrations of various inventive and conventional products in lab tests.

A second generation product was developed based on the results of Component (A): Component (B), N,N-dimethyldecylammonium chloride. Initial results on platform "A" fluids showed almost 80% removal of WSO, approximately twice as effective as Component (A) at identical treatment rates (1000 ppm). Both of these products along with some conventional cationic water clarifiers were tested on field samples from platform "B", also located in the Gulf of Mexico. This facility's WSO levels typically are 50–60 ppm, where total oil and grease is about 65 ppm by IR. These results are shown in FIG. 4. FIG. 4 shows that some conventional cationic water clarifiers do remove a small percentage of WSO typically about 10–15%. RBW52, RBW264, and RBW6088 are all commercially available products sold by Baker Petrolite.

Figure 5:
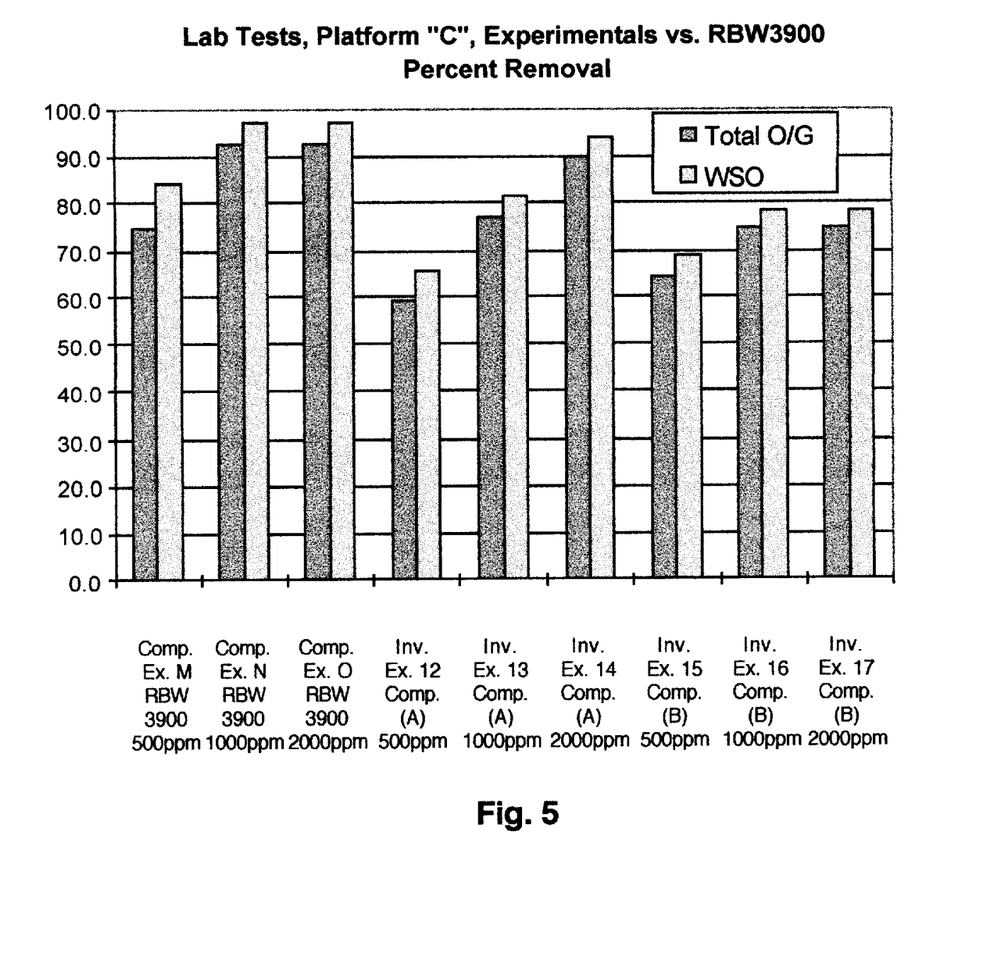
FIG. 5 is a chart of the percent removal of total O/G and WSO at various concentrations of two inventive and one conventional products in lab tests.

Samples were received from a third Gulf platform, platform "C". The two new experimental products were tested against RBW3900. This facility typically has WSO levels of around 35–40 ppm; total oil and grease is about 67 ppm by IR. These results are shown in FIG. 5. Component (A) at 2000 ppm shows comparable performance to the current product, RBW3900, at similar concentrations.

EXAMPLE 18

Figure 6:
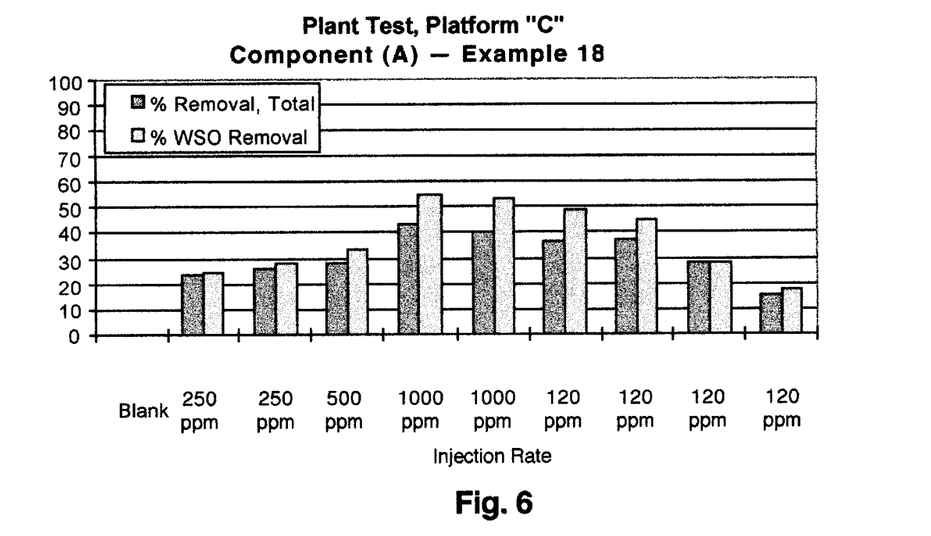
FIG. 6 is a chart of the percent removal of total O/G and WSO at various concentrations of an inventive product in a plant test over time.
Figure 7:
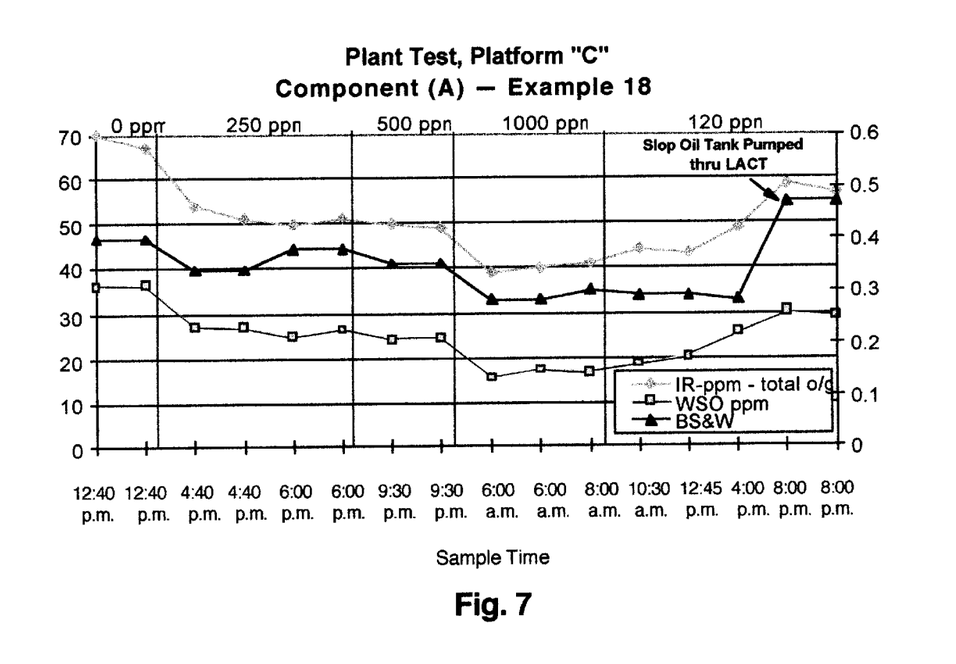
FIG. 7 is a chart of the plant test data of FIG. 6 indicating sample time, actual ppm and %BS&W.

Next, a plant test was completed at platform "C" using Component (A). The results are shown in FIG. 6. Initially, Component (A) was injected into the header at 250 ppm based on the water production. The rate was raised to 500 ppm, 1000 ppm, then dropped back to 120 ppm. Samples were taken at each injection concentration and analyzed by the freon extraction IR-silica gel method. At an injection rate of 1000 ppm, 54% of the WSO content was removed. FIG. 7 shows the same plant test data indicating sample time, actual ppm, and %BS&W (bulk solids and water). The %BS&W reading at 8:00 p.m. is artificially high due to pumping the slop oil tank through the LACT unit (lease automatic custody transfer). Duplicate water samples from 12:40 p.m. were sent to the lab for gravimetric analysis. At 0 ppm of Component (A), the total oil and grease by gravimetric was 24 and 22 ppm, respectively. At the 6:00 a.m. sample time, injecting 1000 ppm of Component (A), the gravimetric result dropped to 8 ppm total oil and grease.

Lab, field, and plant test results are presented for new inventive, non-acid WSO removal products. As shown, the results indicate these products remove more WSO than traditional water clarification chemicals. Bottle test results indicate that as much as 90% of the WSO content of produced oilfield water can be removed by these new compositions. Plant test results show up to 54% removal of WSO content at some facilities. These new products, in some embodiments, are non-acid and thus, do not require special handling. Additionally, these products require no special equipment. Typically these new products allow traditional water clarification chemicals to work more effectively since they do not depress the pH of the produced water, as do the acid-based products.

An advantage of the present invention is that it has no corrosive side effects or handling issues, as is typical with acid-based products. The pH of the products of this invention is around 7. The pKa of HCl is −7. The pKa of the ammonium salts of this invention is in the range of 10–12.

EXAMPLES 19–27 AND P-R

Four products were tested: Component (A); Component (B); Component (C)—a blend of Component (B) and 70% glycolic acid in a proportion of 186 ppm:350 ppm; and RBW3900. Neat products were tested with both mild (1018) and stainless (316L) steel. Also tested with mile steel was 600 ppm of each product in produced water samples.

Test cells (product and coupon) were assembled in mud bombs and back-pressured to prevent solvent loss. The mud bombs were heated for 144 hours to 110° F.±10° F. (43° C.±5.5° C). At the end of the test, weight loss was measured and converted to mpy.

At 600 ppm on mild steel, all of the inventive products exceeded the performance standard of RBW3900. These Examples using actual produced water simulated real world conditions. Similar performance was seen on the test of neat products on stainless steel. Neat product tested on the mild steel showed that Component (C) was the only inventive product that did not perform as well or better than the standard. Stainless steel containers may be used to store the inventive products, whereas RBW3900 must be stored in a plastic container.

TABLE II

Mild and Stainless Steel Corrosivity: 144 hours at 110° F. (43° C.)

| Ex. Inhibitor | Metal | Initial Wt. (g) | Final Wt. (g) | Weight Loss (g) | mpy |
|---|---|---|---|---|---|
| 19 Comp. (B), neat | 1018 | 7.1614 | 7.1541 | 0.0073 | 2.4504 |
| 20 Comp. (A), neat | 1018 | 7.6740 | 7.6691 | 0.0049 | 1.6448 |
| 21 Comp. (C), neat | 1018 | 7.1485 | 7.1239 | 0.0246 | 8.2576 |

TABLE II-continued

Mild and Stainless Steel Corrosivity: 144 hours at 110° F. (43° C.)

| Ex. Inhibitor | Metal | Initial Wt. (g) | Final Wt. (g) | Weight Loss (g) | mpy |
|---|---|---|---|---|---|
| P RBW3900, neat | 1018 | 7.676 | 7.6683 | 0.0077 | 2.5847 |
| 22 Comp. (B), neat | 316L | 6.8080 | 6.8091 | −0.0011 | −0.3692 |
| 23 Comp. (A), neat | 316L | 6.8426 | 6.8425 | 0.0001 | 0.0336 |
| 24 Comp. (C), neat | 316L | 6.7576 | 6.7568 | 0.0008 | 0.2685 |
| Q RBW3900, neat | 316L | 6.5199 | 6.5042 | 0.0157 | 5.2701 |
| 25 Comp. (B), 600 ppm | 1018 | 7.4906 | 7.491 | −0.0004 | −0.1343 |
| 26 Comp. (A), 600 ppm | 1018 | 7.6976 | 7.6971 | 0.0005 | 0.1678 |
| 27 Comp. (C), 600 ppm | 1018 | 7.6449 | 7.6451 | −0.0002 | −0.0671 |
| R RBW3900, 600 ppm | 1018 | 7.5541 | 7.5494 | 0.0047 | 1.5777 |

EXAMPLES S, T AND 28–33

Figure 9:
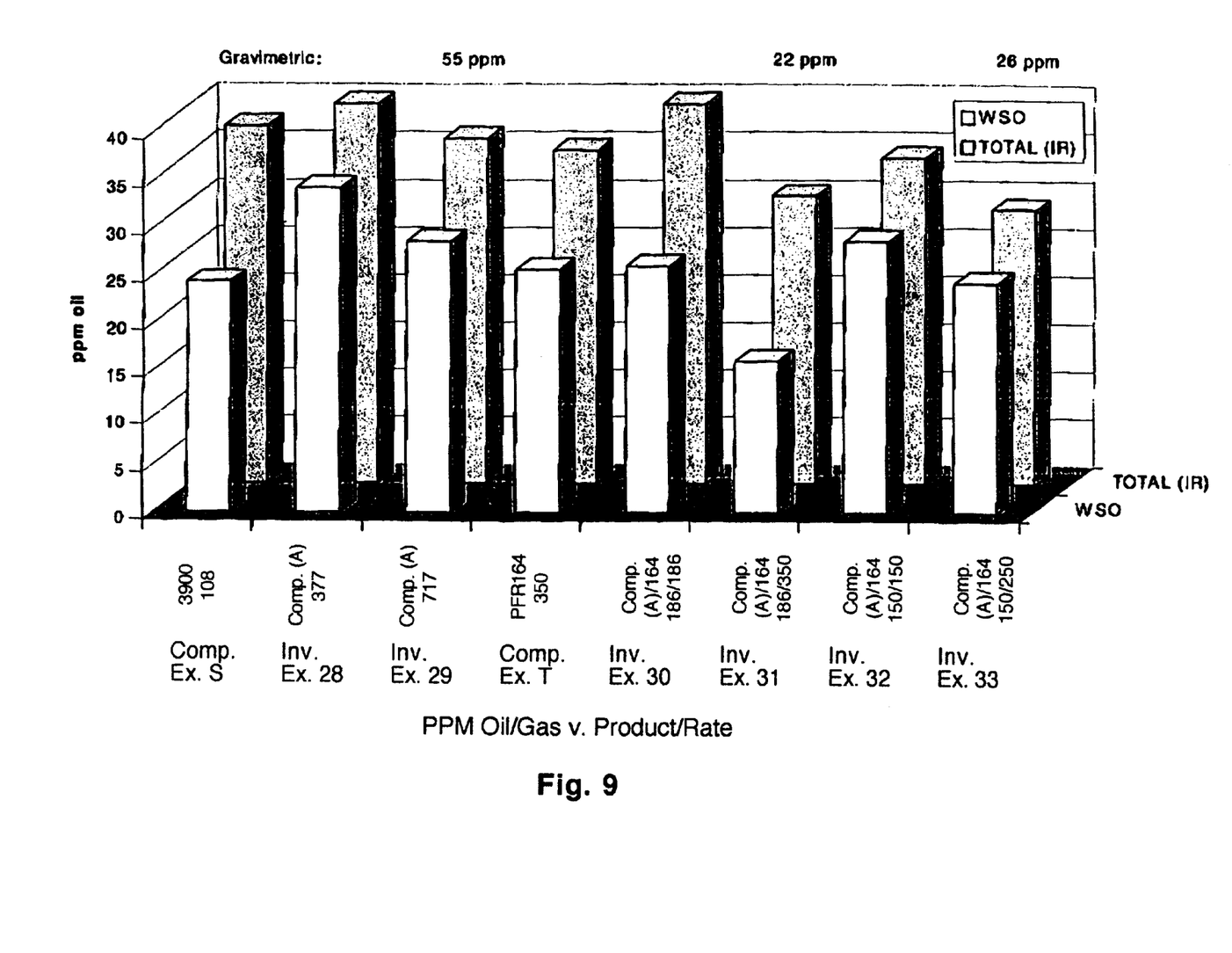
FIG. 9 is a chart of the percent of oil present at various concentrations of various inventive blend and conventional products in lab tests.
Figure 10:
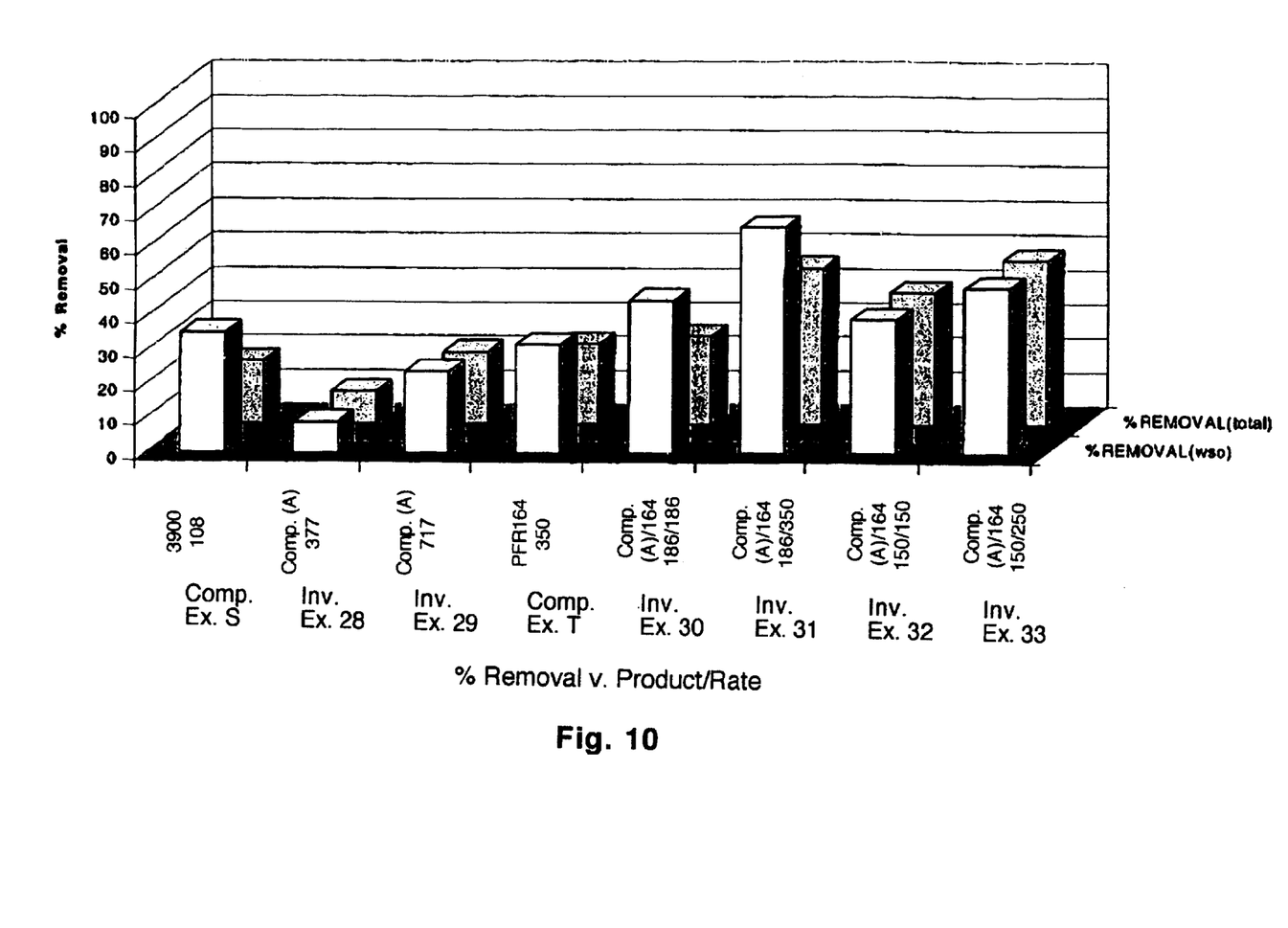
FIG. 10 is a chart of the percent removal of total O/G and WSO at various concentrations of various inventive blend and conventional products in lab tests.

It was surprisingly discovered that Component (B) blended with a weak acid, namely glycolic acid, gave synergistically better results than using both separately. That is, the amount of WSO removal gives a better than additive effect than when each component is used separately at the same concentrations. These data are presented in FIGS. 9 and 10. It will be seen in FIG. 9 that for Inventive Example 24, after treatment with a blend of Compound (B) and 70% glycolic acid (PFR164) of 186 ppm:350 ppm (Component (C)), the amount of WSO present was the smallest. It is particularly unexpected since, when Component (B) was used alone in much greater amounts (Inventive Examples 28 and 29), and when glycolic acid was used alone at the same proportion (Comparative Example T), larger amounts of WSO were retained. Similarly, in FIG. 10, the amount of WSO removed is the greatest for Inventive Example 31, about 70%. It may thus be seen that the organic ammonium salts of this invention are useful when blended with mild acids.

EXAMPLE 34

Figure 11:
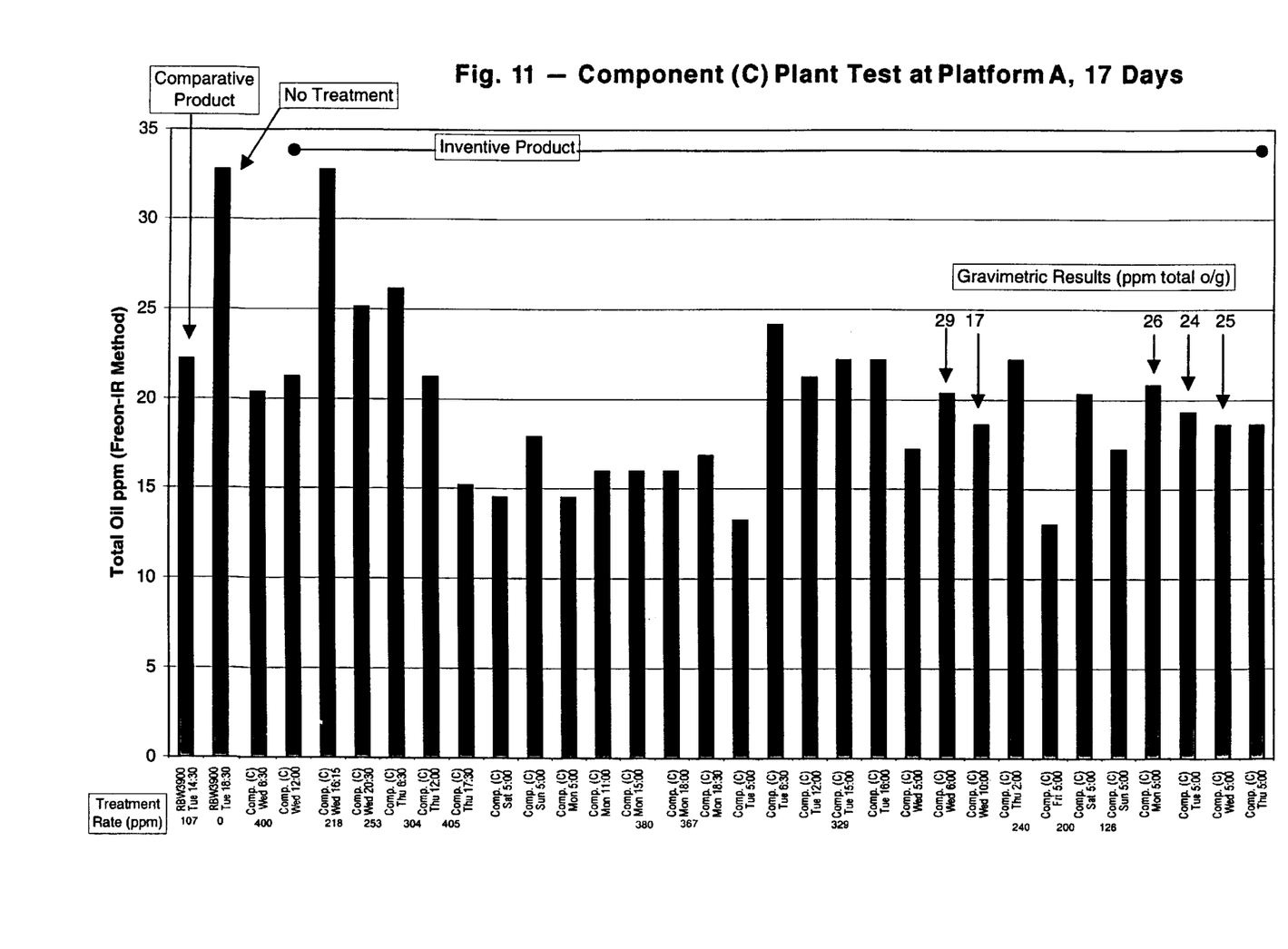
FIG. 11 is a chart of plant test data from an offshore platform over seventeen days.
Figure 12:
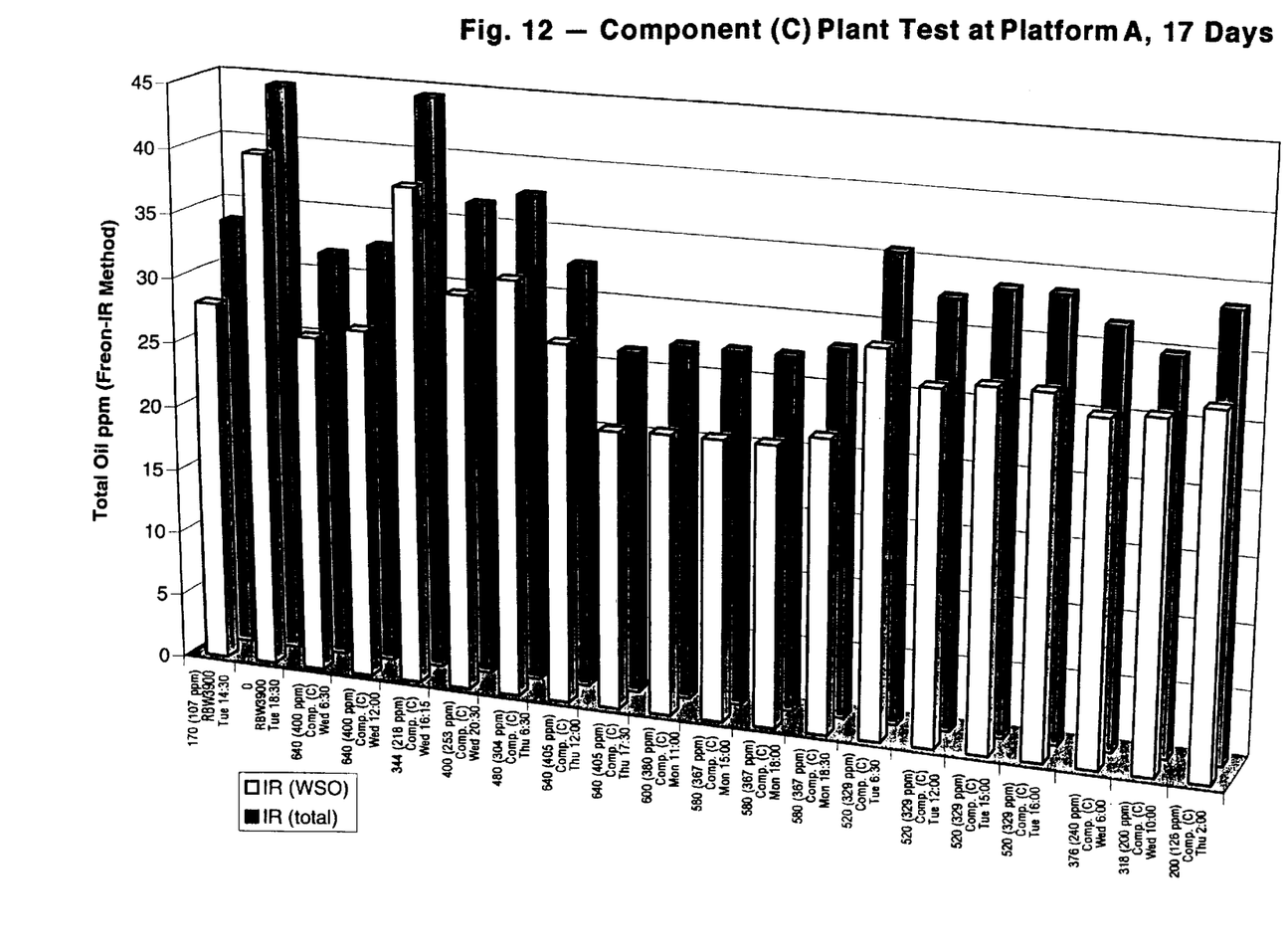
FIG. 12 is a chart of additional plant test data from the same offshore platform that produced the FIG. 11 data over seventeen days.

Component (C) was plant tested at off shore Platform A for 17 days. The treatment rates, sample times, percent removal of oil, total O/G and WSO are reported in FIGS. 11 and 12. It can be seen that inventive Component (C) was effective in removing WSO. It is expected that with further optimization that the inventive compositions can perform even better.

The compositions of this invention work with existing equipment, and perform in mixed production.

In the foregoing specification, the invention has been described with reference to specific embodiments thereof, and has been demonstrated as effective in removing WSO from oil process water. However, it will be evident that various modifications and changes can be made thereto without departing from the broader spirit or scope of the invention as set forth in the appended claims. Accordingly, the specification is to be regarded in an illustrative rather than a restrictive sense. For example, specific organic ammonium salts, proportions thereof, and combinations thereof, other than those specifically tried, falling within the claimed parameters, but not specifically identified or tried in a particular application to remove WSO, are within the scope of this invention. Additionally, blends of organic ammonium salts together with mild acids other than those tried or mentioned herein would also be within the scope of this invention.

We claim:

1. A method of removing water soluble organics (WSO) and oil from a liquid containing water comprising:

contacting the liquid with an effective amount of an organic ammonium salt having the formula $R^1R^2R^3N^+H\ X^-$ where $R^1$ is a saturated or unsaturated alkyl group or an aryl group, or saturated or unsaturated alkyl group or an aryl group substituted with a heteroatom selected from the group consisting of N, O, S, P and halogen;

$R^2$, and $R^3$ are independently H or a saturated or unsaturated alkyl group or an aryl group, or saturated or unsaturated alkyl group or an aryl group substituted with a heteroatom selected from the group consisting of N, O, S, P and halogen; and where $R^1$ averages from about 4 to about 20 carbon atoms, and where $R^2$, and $R^3$ independently are H or average from about 1 to about 8 carbon atoms;

X is selected from a group consisting of halogen and anions of protic acids; and separating an oil phase containing said water soluble organics from a water phase in the absence of adding an acid having a pKa of less than or equal to 3.2.

2. The method of claim 1 where the organic ammonium salt and any other active ingredients total 40–60 wt. % of an aqueous solution, and the aqueous solution is added in a proportion ranging from about 50 to about 2,000 ppm, based on the total amount of liquid.

3. The method of claim 1 where the WSO include petroleum carboxylate anions.

4. The method of claim 1 where the liquid selected from the group consisting of:

oil process water;

desalter water;

overhead accumulator/knockout pot water;

industrial waste waters;

refinery slop oil;

recycled oil;

ship ballast water;

oil storage terminal tank water bottoms;

fluids resulting from fatty acid-based synthetic rolling oils; and fluids from dairy and food processing plants.

* * * * *